United States Patent
Rothenberger

[11] Patent Number: 4,743,429
[45] Date of Patent: May 10, 1988

[54] OXYGEN GENERATOR WITH A PRESSURE TANK AND A CARTRIDGE HOLDER FOR COMBUSTIBLE OXYGEN CARTRIDGES

[75] Inventor: Helmut Rothenberger, Falkenstein, Fed. Rep. of Germany

[73] Assignee: Rothenberger GmbH & Co. Werkzeuge-Maschinen KG, Frankfurt am Main, Fed. Rep. of Germany

[21] Appl. No.: 925,824

[22] Filed: Oct. 30, 1986

[30] Foreign Application Priority Data

Oct. 31, 1985 [DE] Fed. Rep. of Germany ....... 3538764

[51] Int. Cl.4 ................................................ B01J 7/00
[52] U.S. Cl. ..................................... 422/120; 141/21; 141/82; 422/167
[58] Field of Search ............... 422/120, 164, 167, 117, 422/165; 141/18, 21, 82, 98

[56] References Cited

U.S. PATENT DOCUMENTS

| | | | |
|---|---|---|---|
| 2,775,511 | 12/1956 | Geffroy et al. | 422/167 |
| 3,117,424 | 1/1964 | Hebenstreit | 422/167 |
| 3,573,001 | 3/1971 | Bovard | 422/120 |
| 4,111,661 | 9/1978 | Rothenberger | 422/117 |
| 4,230,667 | 10/1980 | Williams | 422/120 |
| 4,628,970 | 12/1986 | Vasella | 422/167 |

Primary Examiner—Barry S. Richman
Assistant Examiner—William R. Johnson
Attorney, Agent, or Firm—Felfe & Lynch

[57] ABSTRACT

Oxygen generator for cartridges, having a pressure tank and a cartridge holder connected thereto. The cartridge holder is divided by a gas-tight separable joint into two halves, and its interior is in communication through an opening with the interior of the pressure tank. To maintain functionality over a long period of time, the bottom half of the cartridge holder is joined to the pressure tank with good thermal conductivity in the area of the separable joint and is in communication with the pressure tank through an unplugged opening which is narrow in proportion to the inside cross section of the lower half. Further, the upper half of the cartridge holder is superimposed on the bottom half directly at the top of the pressure tank and is provided with a cooling structure.

11 Claims, 3 Drawing Sheets

OXYGEN GENERATOR WITH A PRESSURE TANK AND A CARTRIDGE HOLDER FOR COMBUSTIBLE OXYGEN CARTRIDGES

The invention relates to an oxygen generarayor for use with combustible cartridges which yield oxygen in the burning state, having a pressure tank and cartridge holder connected therewith, the latter being divided by a gas-tight separable joint into two halves, and its interior communicating with the interior of the pressure tank through an opening.

European patent application publication EP-OS No. 0 142 730 discloses an oxygen generator of the kind described above, in which the cartridge holder has at one end, in addition to the separable joint, a connecting thread with which it is replaceably connectable as a unit with compressed gas bottles. If the compressed gas bottles have a non-return valve adjacent the connecting thread, the pressure present in the compressed gas bottle is maintained after the cartridge holder is unscrewed.

Although both halves of the cartridge hoider are provided in the known system with cooling rib, a relatively high temperature establishes itself at the separable joint situated approximately at the axial center of the cartridge, and this gradually renders the separable joint—in the form of a screw thread—hard to unscrew, and places a high thermal stress on the gasket present in the separable joint. It is to be noted that the burning temperature at the surface of the cartridge can easily amount to 650° C., and that the burning zone migrates through the separable joint. When fresh cartridges are loaded at short intervals this leads to an additional temperature rise entailing correspondingly greater heat problems.

Through German patent application publication DE-OS No. 24 61 681 it is already known to house a one-piece cartridge holder completely inside of a pressure tank, so that the entire heat generation takes place inside of the pressure tank and places a high thermal stress thereon, so that special precautions have to be taken to protect the pressure tank against corrosion. Also, the cartridge holder has to be removed from an opening of suitably large dimensions for replacement of cartridges, so that when a cartridge is changed the originally virtually pure oxygen is replaced by a nitrogen content of about 80% from the ambient atmosphere. This leads to difficulty in controlling the burning of a flame supplied by the oxygen generator, since the oxygen content first gradually increases from about 20% to nearly 100%. This process repeats itself each time a cartridge is replaced by a new one.

U.S. Pat. No. 2,775,511 discloses an oxygen generator in which the one-piece cartridge holder is entirely outside of the pressure tank, so that the latter cannot support the cartridge holder during cooling. The cartridge holder is provided with cooling ribs of very large area, yet in this case too there is a very high thermal stress on a gasket between the cartridge holder and a cap. The cartridge holder is connected to the pressure tank by a comparatively long tube extending into the pressure tank, and a non-return valve is disposed at the end of the tube. If such a valve were not present, a cleaning fluid present in the pressure tank would be thrown out of it if an overpressure were still present and the cartridge holder were to be opened. The non-return valve furthermore leads to a pressure increase if the cartridge holder is repeatedly reloaded without a corresponding consumption of the oxygen, and this has to be limited by a safety valve. As a result, the known apparatus has a relatively very complicated construction.

A non-return valve between cartridge holder and pressure tank even in the apparatus according to European patent application publication EP-OS No. 0 142 730 has the consequence that, if new cartridges are repeatedly loaded in, a corresponding pressure increase occurs, which has to be limited by a relief valve.

The invention is therefore addressed to the problem of designing an oxygen generator of the kind described above, in which the ease of screwing and unscrewing and the sealing quality of the separable joint is preserved over a long period of time, and in which, even without a non-return valve, any dilution of the oxygen remaining in the pressure tank by nitrogen from the ambient air will be very thoroughly prevented.

SUMMARY OF THE INVENTION

The solution of the stated problem is accomplished according to the invention, in the oxgen generator described in the beginning, by the fadt that
(a) the lower half, with good thermal conduction in the area of the separable joint, is inserted into the pressure tank and is in communication with the latter through an unplugged opening which is narrow in proportion to the internal cross section of the lower half, and
(b) the upper half is superimposed on the lower half directly above the pressure tank and is provided with a cooling means.

At the same time it is especially advantageous if the separable joint is disposed approximately at the axial center of the cartridge.

Due to the fact that the cartridge holder protrudes from the pressure tank, preferably by about half its length, a considerable part of the quantity of heat develops outside of the tank, and even there it is yielded to the ambient air through the shortest possible path.

This is furthermore favored by the fact that, in an especially advantageous manner, the part of the cartridge holder that lies outside of the pressure tank is made from a material of good thermal conduction, for example brass, and it is also provided with cooling ribs. By "good thermal conduction" or "good thermal conductivity" is meant thermal conduction or thermal conductivity of the order of thermal conduction or thermal conductivity of a metal or metal alloy.

Due to the good thermal conduction of the connection of the bottom half of the cartridge holder, which, for example, is made of steel, the portion of the heat that forms therein is transferred by thermal conduction to the mass of the relatively thick-walled pressure tank, i.e., distributes itself in this manner, and then is yielded to the ambient air through the relatively large surface of the pressure tank. Since the good thermal conduction of the connection is present in the area of the separable joint, the latter, including its gasket, is very effectively cooled, so that its functionality is preserved over a very long period of time.

By means of a bore which is small in proportion to the inside cross section of the cartridge holder and is always open to the interior of the pressure ank, the use of a failure-prone non-return valve is avoided, and at the same time any marked amount of air is prevented from entering into the pressure tank when the cartridge holder is opened or the cartridge is replaced (throttling effect). No more than an extremely slight exchange of gas through diffusion is possible, i.e., an extremely slow process.

Particularly, however, the unplugged bore offers an additional factor of safety against excess pressure: each time that a cartridge is changed, any oxygen that may still be under pressure must necessarily escape through the bore and the (open) cartridge holder, so that each oxygen filling begins at atmospheric pressure and any step-by-step buildup of pressure is prevented. A failing safety valve thus represents no hazard to the operator.

Especially it is possible to withdraw oxygen of uniform purity from the oxygen generator from the beginning, so that no problems occur with regard to the way in which a flame supplied with the oxygen will burn.

The smaller the cartridge holder capacity above the above-described narrow bore is, the more uniform will be the composition of the oxygen before and after a charge, and when a cartridge is replaced, it is necessarily vented to the air. As a rule, therefore, the cartridge holder is to surround the cartridge as closely as possible, i.e., with a gap of one millimeter and less. It is therefore especially desirable for the volumetric ratio between the interior of the cartridge holder and the interior of the pressure tank to be between 1:0 and 1:60. For example, the interior volume of the cartridge holder can be between about 80 and 100 cubic centimeters to accommodate standardized cartridges, while the pressure tank preferably has a capacity of 4000 cubic centimeters.

Consequently, a sufficiently large amount of material can be contained in the walls of the ressure tank to serve additionally for the removal of heat. This is especially the case when the wall thickness of the pressure tank in the region of the cartridge holder amounts to at least 1.5 mm, preferably to at least 2.0 mm. In the case of a wall thickness of 3 mm which was used in practice, and a relatively long time interval between charges, the temperature of the seperable joint did not exceed a level of about 80° C.

Cartridges, especially jacketless cartridges, of a mixture of chemical compounds from which oxygen is released by an exothermic reaction have long been known. As a rule it is a mixture of an alkali metal chlorate or perchlorate and an oxidizable substance which, when it burns after being ignited, yields just enough heat for the reaction to continue in the cartridge at an approximately uniform rate of migration, while excess oxygen is continuously released. The reaction mixture is formed into a solid, pressed body, namely the cartridge referred to. The temperature in the reaction zone is about 650° C.

Such standardized cartridges have a diameter of 2.7 cm and a length of 11.7 cm, and therefore a volume of about 67 cubic centimeters. Such a cartridge supplies on the average about 30 liters of oxygen at standard pressure, so that a pressure tank with a capacity of about 4 liters can be filled to a pressure of barely 8 bar.

With the oxygen generator according to the invention it is possible to refill the pressure tank quickly and cheaply, even on Sundays and holidays, i.e., typical do-it-yourself days. The cartridge can be stored saely in large quantity with the exclusion of moisture. The cost of the refill amounts to about 20% of the price of a filled compressed gas bottle obtainable commercially. The oxygen suppliers charge large sums for the circulation of the bottles. While the refilling itself is cheap, transportation and handling are costly.

The refilling of a pressure tank is furthermore environmentally safe, since no longer will large numbers of empty gas cylinders be discarded. The burnt cartridges themselves consist of harmless salts, especially sodium chloride, and of oxides of the combustible components. Thus the burnt cartridges constitute no threat to the environment.

The subject matter of the invention, in conjunction with a fuel gas bottle, serves for welding and brazing with small and miniature burners down to the microburner. In addition to typical do-it-yourself work, the subject matter of the invention is suitable for crafwork of all kinds, goldsmithing, model building, and repair work, in the field of refrigeration, and for work in dental laboratories.

The fuel gases can be propane and butane, mixtures of these gases, and comparable gases, which are offered world-wide by numerous companies. Also usable are fuel gases containing acetylene.

In accordance with the invention, an oxygen generator for combustible cartridges yielding oxygen in the burning state, comprises a pressure tank having an interior, and a cartridge holder which is connected with the pressure tank and which is divided by a gas-tight separable joint into two halves each having an interior. The cartridge holder comprises a lower bottom partial housing which is connected with good thermal conductivity in the region of the separable joint to the pressure tank and has an unplugged opening providing communication of the interior of the lower partial housing with the interior of the pressure tank. The unplugged opening is narrow in proportion to the inside cross section of the lower partial housing. The cartridge holder also comprises an upper partial housing which is superimposed directly above the pressure tank onto the lower partial housing and which includes means for cooling the upper partial housing.

For a better understanding of the invention, together with other and further objects thereof, reference is made to the following description, taken in connection with the accompanying drawings, and its scope will be pointed out in the appended claims.

Referring now to the drawings.

DESCRIPTION OF A PREFERRED EMBODIMENT

Figure 1:
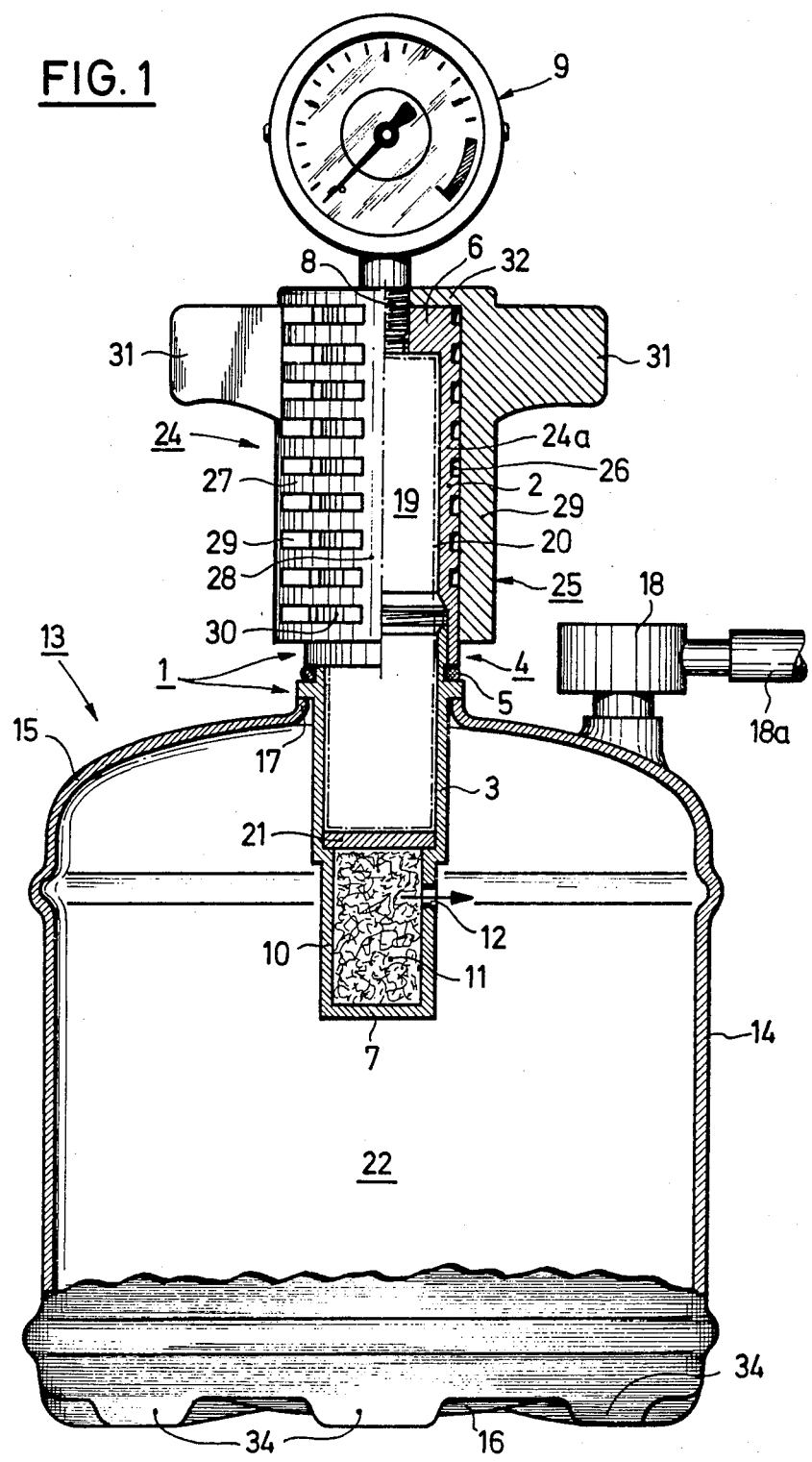
FIG. 1 is a reduced-scale vertical axial cross sectional view through a complete oxygen generator.

FIG. 1 shows a cartridge holder 1, which preferably comprises two capsule-like halves 2 and 3 which are joined together by a separable joint 4 which preferably is in the form of a screw thread and preferably is sealed by an annular gasket 5.

The halves 2 and 3 have end walls 6 and 7, respectively. Into the end wall 6 thre preferably is screwed a threaded nipple 8 of a pressure gauge 9 which measures the pressure in the entire system. The end wall 7 is the bottom wall of a narrowed cylindrical prolongation 10 of the half 3, in which there is a filter material 11 and a narrow lateral bore 12 for the discharge of the oxygen.

The bottom half 3 is inserted into a pressure tank 13 and has good thermal conductivity in the region of the separable joint; the pressure tank 13 may, for example, be of steel and preferaby has a cylindrical body 14 as well as a top 15 and a bottom 16. The top 15 is provided with a coaxial collar 17 which preferably is welded to the bottom half 3. A pressure reducing valve 18 to which an output hose 18a is connected, completes the pressure tank 13.

The cartridge-holder halves 2 and 3 have an inner chamber 19 which serves to accommodate the described cartridge 20 whose outline is indicated by a broken line. Such cartridges are commercially obtainable under the name "SOLIDOX". The cartridge 20 rests in a spacer 21 whose opposite side faces the filter material 11. A filling of fireclay granules and mineral wool can serve, for example, as the filter material. The margin of the spacer 21 has a profile, not indicated, through which gas can pass from chamber 19 into the prolongation 10.

The cross section of the bore 12 is small in comparison to the inside cross section of the botom half 3, so that an exchange of gases between the (open) cartridge holder 1 and the interior 22 of the pressure tank 3 is retarded.

The upper half 2 of the cartridge holder is placed directly above the pressure tank onto the bottom half 3 and provided with a cooling means 24 which is formed by a plurality of cooling ribs. Thus a temperature gradient is established by which the temperature of the apparatus is markedly reduced in the area of the separable joint. Also after the apparatus has been used, a more rapid exchange of heat with the ambient atmosphere is made possible, so that the apparatus is quickly again ready for use.

The cartridge-holder half 2 is provided on virtually its entire length with a heat guard 25 which comprises a thermal insulating material of high resistance to heat and will be further explained below in conjunction with FIG. 3.

Figure 2:
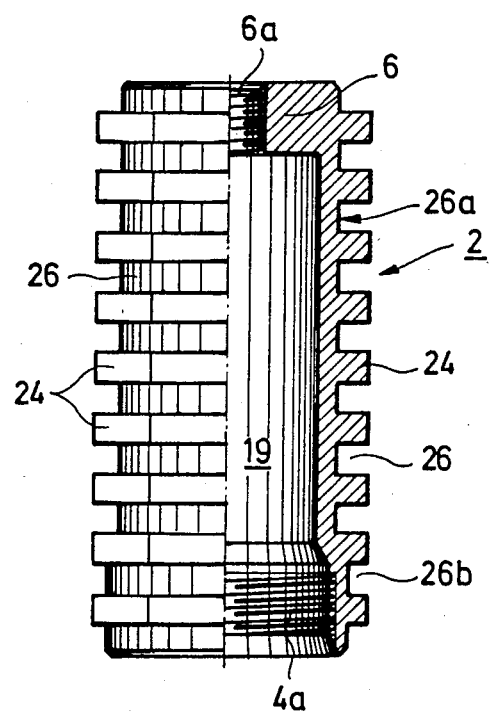
FIG. 2 is an axial cross sectional view through the upper half of the cartridge holder.

In FIG. 2 is represented the upper half 2, which comprises a hexagonal bar of brass in which grooves 26 of cylindrical root 26a are cut, thereby forming cooling ribs 24a of the cooling means 24. The upper half 2 has an internal thread, while the lower half 3 has a complementary external thread, not further indicated, which together form the separable joint 4 (FIG. 1). Only in the area of the separable joint 4 do the grooves 26b have a lesser depth. The threaded bore 6a present in the end wall 6 serves for the attachment of the pressure gauge 9.

Figure 3:
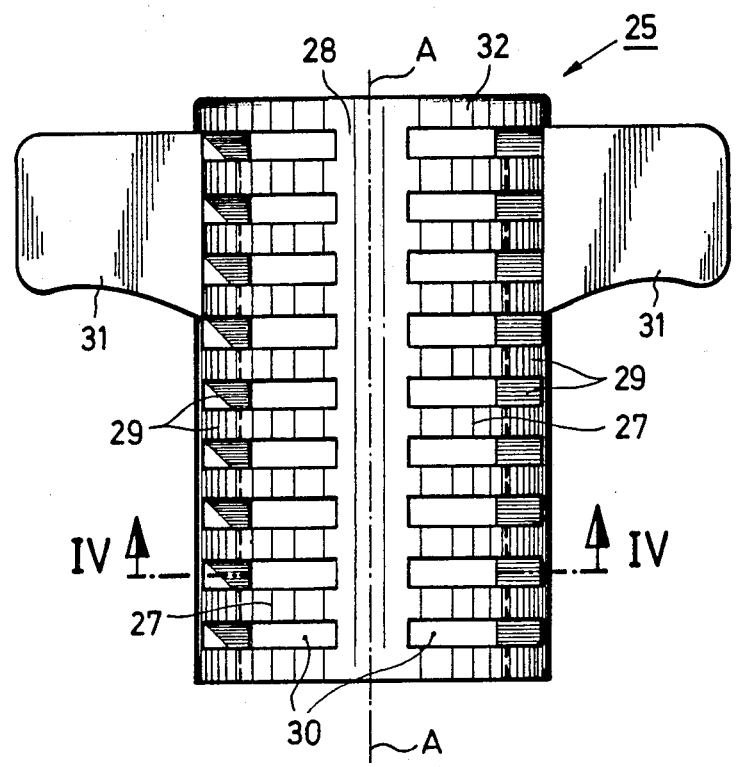
FIG. 3 is a side elevational view of a heat guard for the half shown in FIG. 2.
Figure 4:
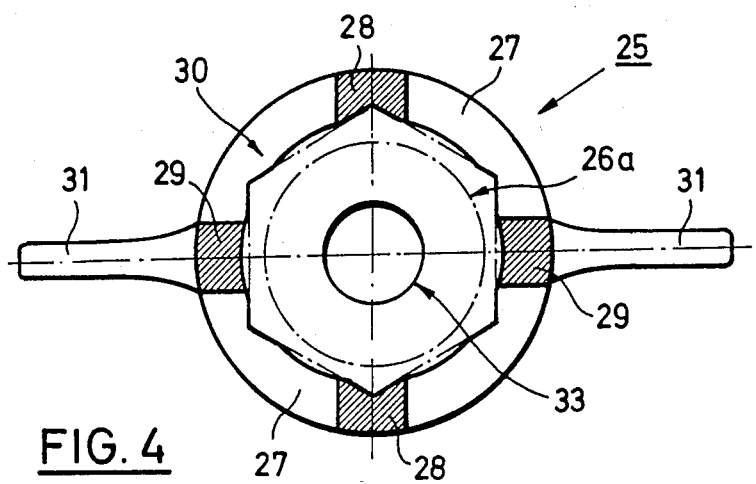
FIG. 4 is a cross sectional view taken along line IV—IV in FIG. 3.

FIGS. 3 and 4 show details of the heat guard 25 in the side view showing its longitudinal axis A—A and in a cross sectional view along the diametral line IV—IV, respectively. The heat guard 25 comprises a plurality of rings 27 disposed coaxially one behind the other, which are joined together on their circumference by axially parallel rails 28 and 29, respectively. In this manner, ventilation openings 30 are formed between the rings 27 and the rails 28 and 29, which are defined by the parallel walls of the rings 27 and form a sort of sector-shaped slots (FIG. 4). It can be seen that the rings 27 are flush with the cooling ribs 24a, so that the grooves 26 between the cooling ribs 24a communicate freely with the atmosphere (FIG. 1).

It can furthermore be seen that the heat guard 25 is provided with radially projecting handles 31 which make the heat guard a kind of wing nut. The hndles 31 are disposed on the diametrically opposite rails 27, while between these rails 29 provided with the handles, the additional rails 28 are offset by 90 degrees and are likewise arranged diametrically opposite one another.

In FIG. 4, the cross section of the outer envelope surface of the cooling ribs is indicated by a broken hexagon. It can be seen that the rings 27 and the rails 28 at the corners of this hexagon are of a shape complementary to the cooling ribs, so that an interlocking joint is formed between the heat guard 25 and the corresponding half 2. In the direction of the axis A—A, however, the heat guard 25 can easily be pushed onto the cartridge-holder half 2. In FIG. 4 the cylindrical root 26a of the grooves is indicated by a broken circle, and it can be seen that between this root and the rails 28 and 29 a sufficient radial gap is present, which permits ventilation on all sides and thus a good cooling of the cartridge-holder half 2 also in the area of the root of the grooves.

The heat guard 25 has, in the vicinity of the handles 31 an end wall 32 having a bore 33 for the threaded nipple 8. After the pressure gauge 9 is screwed into it, the heat guard 25 is held undisplaceably on the half 2.

It can be seen especially from FIG. 4 that the heat guard 25 can easily be stripped from an injection mold of complementary shape if the seams of the mold lie in a plane of symmetry running through the handles 31. The mold can then consist simply of a core mold and two half-molds without removable inserts.

The bottom half 3 is an easy-to-fabricate turning in which the inside diameter has a step to form an annular shoulder for the support of the spacer 21.

It can also be seen in FIG. 1 that the pressure tank 13 preferably has in its bottom 16 a plurality of dish-like recesses on its outer circumference. These recesses (for example, six in number) serve simultaneously as feet, and as collectors for condensate forming in the apparatus, so that condensate cannot collect centrally at a single point in the bottom. It is possible to provide the tank in the bottom area with a drain and plug. The replacement of the cartridge(s) is performed by unscrewing the cartridge-holder half 2 together with the wing-nut-like heat guard 25.

While there has been described what is at present considered to be the preferred embodiment of this invention, it will be obvious to those skilled in the art that various changes and modifications may be made wherein without departing from the invention, and it is, therefore, aimed to cover all such changes and modifications as fall within the true spirit and scope of the invention.

What is claimed is:

1. An oxygen generator for combustible cartridges yielding oxygen in the burning state, comprising:
a pressure tank having an interior, and
a cartridge holder which is connected with the pressure tank and which is divided by a gas-tight separable joint into two halves each having an interior, and the cartridge holder comprising a lower partial housing which is connected by means providing good thermal conductivity in the region of the separable joint to the pressure tank and having means defining an unplugged opening providing communication of the interior of the lower partial housing with the interior of the pressure tank, the unplugged opening being small in proportion to the inside cross section of the lower partial housing of the cartridge holder, and an upper partial housing which is superimposed directly above the pressure tank onto the lower partial housing and which includes means for cooling the upper partial housing.

2. An oxygen generator according to claim 1, which includes a combustible cartridge having an axial center and in which the separable joint is disposed approximately at the axial center of the cartridge.

3. An oxygen generator according to claim 1, in which the volumetric ratio between the interior of the cartridge holder and the interior of the pressure tank is between 1:10 and 1:60.

4. An oxygen generator according to claim 1, in which the lower partial housing extends from the separable joint into the pressure tank.

5. An oxygen generator according to claim 1, in which, when the oxygen-yielding cartridge is inserted, the cartridge has an upper end face lying above the separable joint and a lower end face lying below the separable joint.

6. An oxygen generator according to claim 1, in which the upper partial housing comprises a material of good thermal conductivity relative to steel.

7. An oxygen generator according to claim 6, in which the upper partial housing has external cooling ribs.

8. An oxygen generator according to claim 1, in which the pressure tank has a wall thickness, in the region of the cartridge holder, which is at least 1.5 mm.

9. An oxygen generator according to claim 8, in which said wall thickness, in the region of the cartridge holder, is at least 2.0 mm.

10. An oxygen generator according to claim 1, in which the pressure tank has an outer circimference and has a plurality of dish-like recesses on the outer circumference.

11. An oxygen generator according to claim 10, in which the lower partial housing has a lower end formed by a cylindrical prolongation in which the unplugged opening is located and which oxygen generator includes a filter material in the cylindrical prolongation.

* * * * *